United States Patent [19]

Takahama et al.

[11] 4,079,388

[45] Mar. 14, 1978

[54] ILLUMINATION DETECTING AND RECORDING METHOD AND DEVICE THEREFOR

[75] Inventors: Sho Takahama, Takarazuka; Katsuji Muramatsu, Machida; Yoshihiro Fujita, Yokohama; Tsunemasa Okada, Kobe, all of Japan

[73] Assignee: Fuji Photo Film Co., Ltd., Minami-ashigara, Japan

[21] Appl. No.: 652,678

[22] Filed: Jan. 27, 1976

[30] Foreign Application Priority Data

Jan. 31, 1975 Japan .................................. 50-13732

[51] Int. Cl.² .............................................. G03B 7/08
[52] U.S. Cl. .................................... 354/31; 354/60 R; 354/105; 355/35; 355/38; 355/41
[58] Field of Search .................... 354/22, 23 R, 29, 30, 354/31, 38, 42, 49, 59, 60 R, 60 L, 105, 109; 355/32, 35, 38, 40, 41

[56] References Cited

U.S. PATENT DOCUMENTS

| | | | |
|---|---|---|---|
| 3,475,616 | 10/1969 | Stimson et al. | 354/31 |
| 3,500,730 | 3/1970 | Matsubara et al. | 354/31 |
| 3,580,149 | 5/1971 | Fujisawa | 354/59 |
| 3,672,268 | 6/1972 | Scheibel et al. | 354/31 |
| 3,709,601 | 1/1973 | Zahn et al. | 355/35 |
| 3,850,530 | 11/1974 | Uno et al. | 354/31 |

FOREIGN PATENT DOCUMENTS

2,505,720  8/1975  Germany .......................... 354/23 D

*Primary Examiner*—Russell E. Adams
*Attorney, Agent, or Firm*—Sughrue, Rothwell, Mion, Zinn and Macpeak

[57] ABSTRACT

Conventionally, color films must be used with the light source or illumination for which it was designed, such as for natural daylight, fluorescent-light or tungsten-light or, if used with another light source, a suitable conversion filter must be placed over the camera lens. However, an improvement in the emulsion of the film provide an improved type of film with which good printed images are available through a mere correction during printing of the film. The present invention provides a method and a device for detecting and recording the type of illumination through detection of their spectral properties and detection of existence of a flickering noise due to an alternating voltage of the commercial power supply, and a system for an automatic film development.

10 Claims, 9 Drawing Figures

ILLUMINATION DETECTING AND RECORDING METHOD AND DEVICE THEREFOR

The present invention relates to photography and, more particularly, to a method for detecting lighting condition or types of illumination for the subject to be photographed as to whether the light received in a photographic apparatus, namely a camera, is of natural daylight type, fluorescent-light type of tungsten-light type, and for recording the detected type of light on each frame of the film upon release of a shutter, and also to a device incorporated in the camera for effecting said method.

Conventionally, in taking photographs, film, especially color film, to be loaded in the camera has been selectively chosen from several types of film according to different types of illumination, such as daylight, tungsten-light or fluorescent-light, or when using one type of film with a different type of light source, a suitable conversion filter must be placed over the camera lens according to the different color temperatures of the light sources, so as to obtain favorable results in the photographs. The term color temperature refers to the ratio of red to blue in a particular light source. Therefore, it has been a great inconvenience for photographers either to change the type of film loaded in the camera or or to mount the conversion filters on the camera lens each time the type of illumination changes.

In order to overcome such disadvantages, there has recently been proposed, through development in the field of film emulsion, an improved type of film with which good printed images are available through mere correction, during printing of the film, depending on the types of illumination or natures of light sources under which the photographs are taken, without requiring employment of different filters according to the types of illumination during photograph taking. For making the best of the newly developed film of the above described type, however, it is necessary to identify, at the time of printing, the types of illumination under which the film was exposed, through some identification markings formed on the film during shooting.

Accordingly, a primary object of the present invention is to provide a detecting and recording method capable of detecting types of illumination, i.e., whether the illumination for the subject to be photographed is of daylight type, tungsten-light type or fluorescent-light type, and also capable of forming identification markings therefor on each frame of the film upon release of the shutter of a camera.

Another object of the present invention is to provide a detecting and recording device for effecting the above described method having at least two light sensing means each of which has sensitivity characteristics and spectral characteristics in different spectral ranges from each other, for detecting the particular type of illumination according to the different spectral characteristics of the illumination, and having means for recording identification markings, indicative of the detected illumination type, on each frame of the film.

A further object of the present invention is to provide a camera in which the detecting and recording of the above described type is incorporated.

A still further object of the present invention is to present a printing system employing the film with the identification markings of the illumination type formed thereon, which printing system is capable of carrying out pertinent printing according to the types of illumination, either by reading the identification markings with the naked eye or by automatically reading out the same markings through an automatic reading device.

According to the illumination detecting method of the present invention, the camera is provided with at least two light receiving means, which are a first light receiving means having spectral properties in the infrared range or in the visual range adjacent to the infrared range and a second light receiving means having spectral properties in the ultraviolet range or in the visual range adjacent to the ultraviolet range, for receiving the illumination light from the subject to be photographed at every photographing and for generating an output signal from each light receiving means in relation to the product of wave length distribution characteristics of the illumination light and spectral properties of each light receiving means. The magnitudes of the output signals from the first and second light receiving means are compared to decide which of the light receiving means receives more quantity of light from the subject, thereby distinguishing the illumination light between daylight type including fluorecsent-light having similar wave length distribution to that of the daylight and tungsten-light type having different wave length distribution from that of the daylight.

After having discriminated the tungsten-light type illumination from daylight type illumination with respect to their wave length distribution, the daylight type illumination is further differentiated into natural daylight type, and artificial daylight type such as fluorscent-light by detecting the existence of flickering noise in the artificial illumination, due to the alternating power source of the commerical electric supply.

It should be noted that the discrimination between the tungsten-light type illumination and the daylight type illumination does not necessarily have to be effected before proceeding with the detection of the flickering noise, but the detection of the flickering noise can be effected before the discrimination between the tungsten-light type illumination and the daylight type illumination.

According to the illumination detecting and recording method of the present invention, the order of the above mentioned discrimination and detection is not of importance, but merely changes the combination of the comparing objects.

The type of illumination or nature of light source thus detected by the above mentioned method, is recorded on each frame of the film upon every shutter release of the camera, by utilizing at least two luminescent means provided in the camera at positions adjacent to predetermined portions of the film in the exposure position, which luminescent means are preferably separated from each other by a predetermined distance to face toward the frame of the film for selectively producing light therefrom according to the detected type of the illumination and for recording such light on the film simultaneously with shooting.

Consequently, the developed film may have a mark or marks, such as black spots in particular position on each frame of the film to indicate the type of the illumination at every shooting.

In film processing stations where a large number of exposed films are successively developed for printing, the printing process can be carried out efficiently by automatically reading out such marks in each frame of the film indicating the type of illumination. It is needless to say that these visual marks formed on each frame of the film can easily be read out by the naked eye so as to carry out printing one by one, under a developing condition corrected to suit the type of illumination in which the photograph was taken.

According to the present invention, the illumination detecting and recording device consists essentially of the following three means which are: at least two kinds of light receiving means directed toward a front side of the camera, each having spectral sensitivity in different spectral properties for receiving the light reflected from the subject to be photographed under a particular type of illumination and for generating electrical output signal therefrom in relation to the intensity of the light in particular spectral properties; discriminating means provided in the camera for discriminating the type of illumination between daylight type, fluorescent-light type and tungsten-light type upon receipt of the electrical signals from the light receiving means; and recording means for recording the type of illumination thus detected on the frame of the film located in an exposure position in the camera.

More specifically the illumination detecting and recording device of the present invention is a combination of the following means provided in the camera.

First light receiving means having spectral properties with peak values thereof in infrared regions or in visual regions near the infrared regions for receiving the light in the infrared regions from the subject and for generating an electrical signal in relation to the intensity of the light in above mentioned regions; second light receiving means having spectral properties with peak values thereof in ultraviolet regions or in visual regions near the ultraviolet regions for receiving the light in the ultraviolet regions from the subject and for generating an electric signal in relation to the intensity of the light in above mentioned regions; first discriminating circuit means for comparing the magnitude of the signals produced from the first and the second light receiving means, in other words comparing the intensity of the light between the light in the infrared regions and in the ultraviolet regions, and for generating an output signal representing the tungsen-light when the intensity of the light received on the first light receiving means is greater than that of the second light receiving means, that is when the spectral density of the illumination is high in the regions around infrared regions to indicate that the illumination is of the tungsten-light type; second discriminating circuit means for detecting the existence of flickering noise in the light received on the first and second detecting means by using at least one of the output signals from the first and second detecting means to discriminate whether the illumination is of natural daylight type or artificial daylight type such as fluorescent-light and for generating when the illumination is not of the tungsten-light type, an output signal indicative of natural daylight or artifical daylight; at least two luminescent means provided in the camera adjacent to the exposuring position and preferably separated to each other by a predetermined distance and facing the frame of the film; and controller circuit means for selectively actuating the luminescent means to record a mark or marks on each frame of the film at every photograph takings, whereby indicating the type of the illumination.

According to the illumination detecting and recording device of the present invention, the plurality of the light receiving means can be a combination of phototransducer elements having spectral properties with peak values thereof in different ranges from each other, such as a combination of cadmium sulfide (Cds) and phototransistor which are used independently; however, it is also possible to use the same type phototransducer elements for each light receiving means, with different filters being applied to the surface of each phototransducer element to allow the received light in different properties to pass therethrough, thereby substantially obtaining different spectral properties from each other as in the above mentioned combination of phototransducer elements.

The luminescent means of the present invention mainly consists of at least two light sources such as light emission diodes or miniature light bulbs so as to produce three distinguishable light emissions which would correspond with the mark or marks for indicating daylight type illumination, fluorescent-light illumination and tungsten-light type illumination.

It should be noted that the illumination detecting and recording device of the present invention employed in the camera can be further provided with an additional illumination indicating means which is able to indicate the type of the illumination visually at the outside of the camera or on the screen of view finder, simultaneously with each photograph taking. Such illumination indicating means may be convenient for informing photographers of the type of illumination during shooting especially when it is hard to distinguish the type of illumination by naked eyes.

It should also be noted that the illumination detecting and recording device of the present invention incorporated in the camera may be further provided with a switch means to forcibly de-energize the illumination detecting and recording device during use of flash bulbs or electronic flash or to forcibly record the mark on the film indicative of daylight type illumination, regardless of the type of illumination during shooting, in association with the attachment of electronic flash and the like to the accessory shoe of the camera for flash synchronization.

These and other objects and features of the present invention will become apparent from the following description taken in conjunction with the preferred embodiment thereof with reference to the accompanying drawings in which.

Before the description of the present invention proceeds, it is to be noted that like elements are designated by like reference numerals throughout several diagrams of the attached drawings.

According to the illumination detecting and recording method of the present invention, three different types of illumination, such as daylight type, fluorescent-light type including cool white fluorescent-light type and warm white fluorescent-light type, and tungsten-light type are discriminated by two different kinds of illumination discriminating method. The first discriminating method is effected by detecting the properties of wave length distribution which are different according to the types of illumination, while the second discriminating method is effected by detecting existence of flickering noise in the illumination caused by the alternating voltage of the commercial power supply.

The principle of these first and second discriminating methods can be explained hereinbelow.

Figure 1:
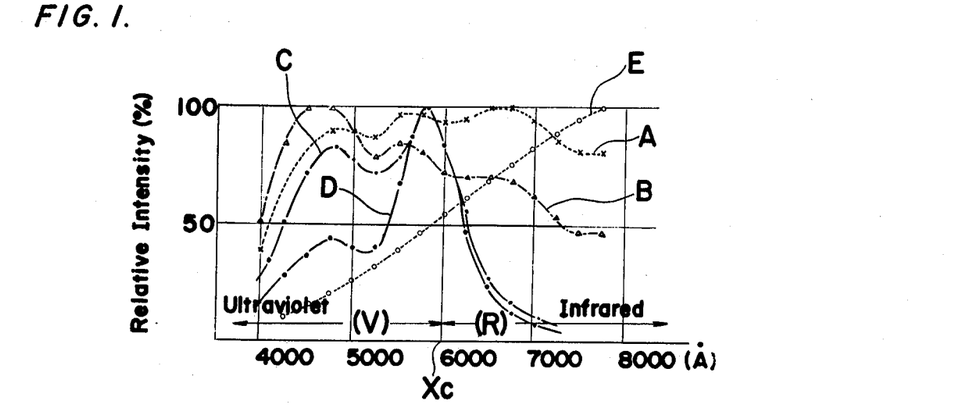
FIG. 1 is a graph showing wave length distribution of various types of lights, wherein the abscissa represents wave length, while the ordinate represents relative intensity.

Referring to FIG. 1, curved lines A and B show the wave length distribution of the direct sun light and average daylight, respectively, which are distributed almost evenly throughout the entire visual light region (4000 A through 8000 A). A curved line C shows the wave length distribution of the light from the wave white fluorescent lamp, which has similar distribution to that of the natural daylight in curves A or B up to the intermediate wave length of Xc (6000 A). It is be noted that, the wave length region lower than the central wave length Xc is defined as ultraviolet region V and wave length region higher than the intermediate wave length Xc is defined as infrared region R. A curved line D shows the wave length distribution of the light from cool white fluorescent lamp, which has a sharp peak value in the ultraviolet region V adjacent to the intermediate wave length Xc.

In contrast with all these curved lines A through D, a line E for the tungsten-light rises linarly from ultraviolet region V to infrared region R, showing particular wave length distribution different from that of the other types of illumination.

Therefore, in a first process, namely lighting condition detecting process, it is possible to discriminate the tungsten light from the rest of the light by obtaining more intensive light from the tungsten light in most of the infrared region as compared with the rest of the light.

On the other hand, in a second process, namely flickering detecting process, the artificial light, for example fluorescent light or tungsten light can be discriminated from natural daylight by detecting the existence of the flickering noise in the artificial light due to the alternating voltage of the commercial power supply.

Accordingly, by combining these two processes together, it is possible to discriminate the types of illumination in three different types thereof, i.e., daylight type, fluorescent-light type and tungsten-light type.

Figure 2:
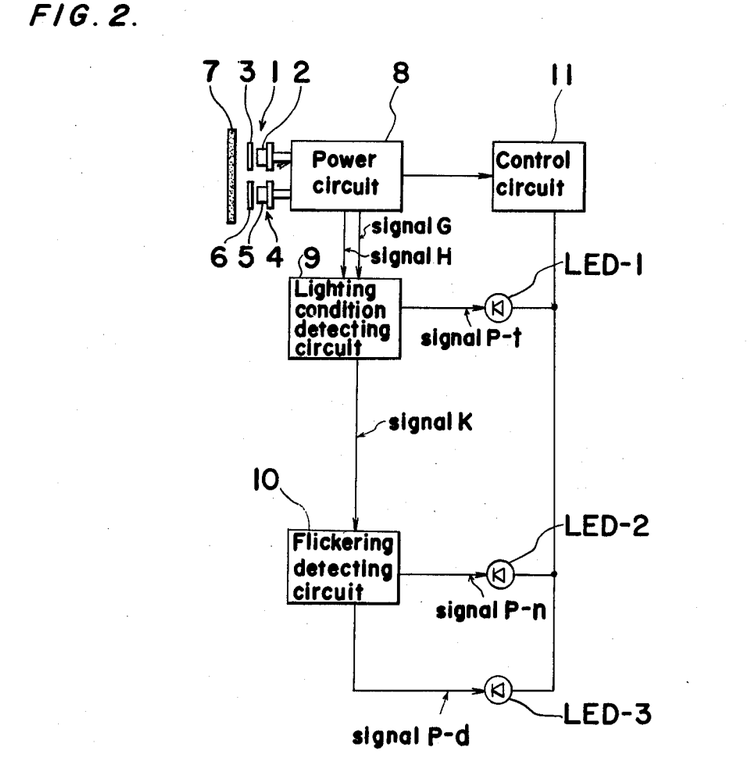
FIG. 2 is a schematic block diagram of illumination detecting and recording device of the present invention.

Referring now to FIG. 2, showing a block diagram of the illumination detecting and recording device of the present invention which comprises a first light receiving means 1 consisting essentially of a light receiving element 2 and a filter 3 provided in front of the light receiving element 2, and a second light receiving means 4 consisting essentially of a light receiving element 5 and a filter 6 provided in front of the light receiving element 5. These first and second light receiving means 1 and 4 are provided at the front side of a camera (not shown) side by side to receive the light from the subject to be photographed through a diffuser 7 closely provided in front of the filters 3 and 6.

Figure 3:
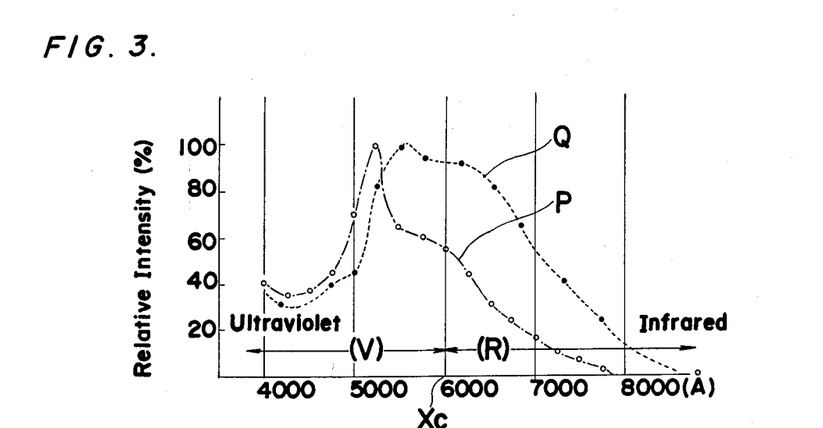
FIG. 3 is a graph showing wave length distribution of light receiving elements employed in the present invention, in the similar manner to that in the graph of FIG. 1.
Figure 4:
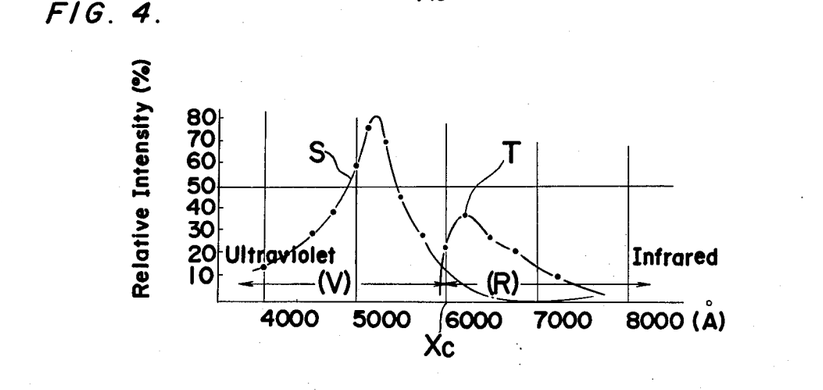
FIG. 4 is a similar graph to FIG. 3, but particularly shows wave length distribution of light receiving elements provided with filters.

Referring also to FIGS. 3 and 4, the light receiving elements 2 and 5, for example, of cadmium sulfide (Cds), having the spectral sensitivity in the visual light ranges as shown in a curved line P in FIG. 3, change their internal resistance in relation to the amount of light received thereby.

Although various types of elements having light receiving properties other than that mentioned above (for example, one shown in line Q of FIG. 3) may be employed as the light receiving element 2 and 5, it is preferable to choose such light receiving elements as are quick in response for efficient detection of the flickering noise.

The filter 3 in the first light receiving means 1 has high spectral transmittance in the infrared region R, as shown in a curved line T in FIG. 4, for allowing only the lights in the infrared region R to reach the light receiving element 2. On the other hand, the filter 6 in the second light receiving means 4 has high spectral transmittance in the ultraviolet region V, as shown in a curved line S in FIG. 4, for allowing only the light in the ultraviolet region to reach the light receiving element 5. Although the peak values of the curved lines R and S may be different from each other, they are suitably amplified by a suitable amplifying means (not shown) to balance each other for the sake of comparison between the amount of light received on the light receiving elements 2 and 5, which comparison will be described in more detail later.

Still referring to FIG. 2, a numeral 8 designates a power circuit for supplying an electric power to the light receiving elements 2 and 5 from a main power source (not shown) employed in the camera and for generating signals G and H indicative of voltage drop down across the light receiving elements 2 and 5, respectively.

Assuming that the light received on the light receiving elements 2 and 5 is of pure infrared light, the light receiving element 2 may produce a maximum signal Gmax and the light receiving element 5 may produce a minimum signal Hmin, whereas assuming the light received on the light receiving elements 2 and 5 is of pure ultraviolet light, the light receiving element 5 may produce a maximum signal Hmax, and the light receiving element 2 may produce a minimum signal Gmin.

These signals G and H are applied to a lighting condition or types of illumination detecting circuit 9 for comparing the ratio of the level of the signal G to that of the above mentioned signal Gmax with the ratio of the level of the signal H to that of the above mentioned signal Hmax.

In comparing these two ratios, it is preferable to make the maximum level of the signal Gmax equal to that of the signal Hmax while the minimum level of the signal Gmin is also equal to that of the signal Hmin.

This can be achieved by preadjusting at least one of the signals G and H to a suitable level with a suitable circuit means (not shown) before applying to the lighting condition detecting circuit 9 thereby the applied signals G and H can be compared without any operation for taking above mentioned ratios.

However, if above mentioned signals G and H were not preadjusted in said manner, it is possible to compare above mentioned ratios directly in the lighting condition detecting circuit 9 by forming any known comparator such as a bridge circuit therein.

After having compared the signals G and H in the above mentioned manner, the lighting condition detecting circuit 9 generates two types of signals P-$t$ and K. The signal P-$t$ is produced when the lighting condition detecting circuit 9 detects that the signal G is greater than signal H, i.e., when the light from the illumination consists mainly of the light in the infrared regions, such as tungsten-light. On the other hand, the signal K is produced when the signal H is greater than or equal to the signal G, i.e., when the type of the illumination consists mainly of the light in the ultraviolet region, such as daylight or fluorescent-light.

As described in FIG. 2, the signal K is applied to the flickering detecting circuit 10, for detecting the existence of the flickering noise in the signal K. When this flickering detecting circuit 10 detects the alternating noise in the signal K, which occurs when the light from the illumination contains the flickering noise, the flickering detecting circuit 10 produces a signal P-$d$ which indicates that the type of the illumination is of artificial daylight type illumination, such as fluorescent-light. On the other hand, when this flickering detecting circuit 10 detects no alternating noise in the signal K, which occurs when the light from the illumination contains no flickering noise, the flickering detecting circuit 10 produces a signal P-$n$ which indicates that the type of the illumination is of natural daylight illumination such as sun light.

Above mentioned signals P-$t$, P-$d$ and P-$n$ are applied to light emission diodes LED-1, LED-2 and LED-3, respectively to produce a light therefrom upon receipt of the signals P-$t$, P-$d$ and P-$n$, for indicating the type of illumination.

The numeral 11 designates a control circuit for supplying an electric power to the light emission diodes LED-1, LED-2 and LED-3 from the power circuit 8 and for controlling a power supplying period which is long enough for any of activated light emission diodes LED-1, LED-2 and LED-3 to form a identification mark by projecting light from the activated light emission diode onto the frame of the film in a position ready to be exposed, i.e., at the exposure station.

These light emission diodes LED-1, LED-2 and LED-3 can be provided in a camera in such a manner as described hereinbelow.

Figure 5:
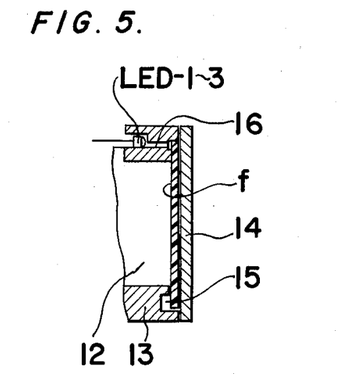
FIG. 5 is a cross sectional view of the film exposure station of the camera showing positions of light emission diodes incorporated therein.

Referring to FIG. 5, a frame 13 of a camera, which forms an aperture 12 for allowing the light to pass therethrough onto the surface of the film 5, has three bores in upper portion thereof, being aligned with each other in parallel relation to a film forwarding or film winding direction. It should be noted that in FIG. 5, only one bore 16 amoung three bores can be seen. The light emission diodes LED-1, LED-2 and LED-3 are inserted into these three bores with their luminous portions directed toward opening of the bores.

Figure 6:
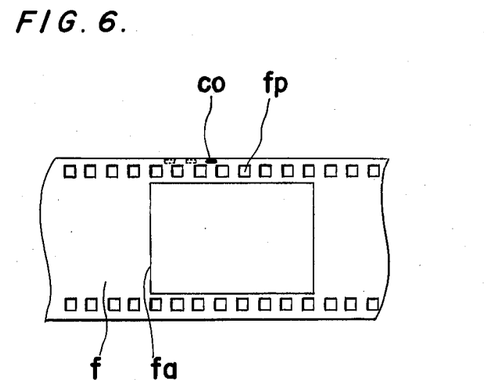
FIG. 6 is a fragmental view of a developed film, on an enlarged scale, showing positions of identification marks formed thereon.

Referring also to FIG. 6, a film $f$ which is held stationary at the exposure station by the frame 13 and a film pressure plate 14, overlaps with those three bores in a position adjacent to perforation $fp$ thereof without intruding into a image receiving portion $fa$, thereby the light received from any one of the light emission diodes LED-1, LED-2 and LED-3 may form a visual identification mark $co$ in a particular position when the film is developed. The three different positions of the marks $co$ may indicate three different types of illumination such as natural daylight type, fluorescent-light type or tungsten-light type.

It should be noted that each of the marks $co$ should be preferably formed in an oval, elongated shape extending in a direction parallel to the film forwarding direction, so as to enable a fast read-out by a suitable read-out means (not shown) employed in a step of printing and developing process.

One embodiment of the illumination detecting and recording device is described in detail hereinbelow.

Figure 7:
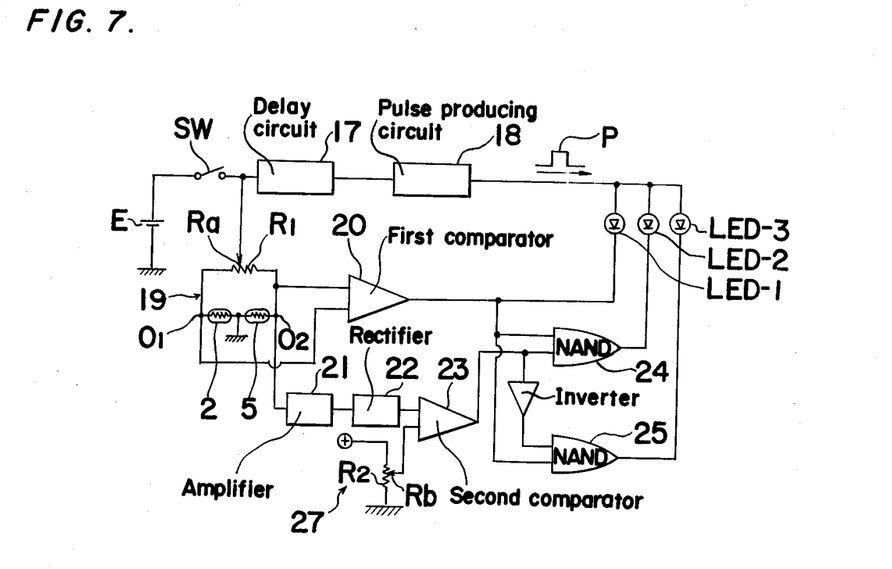
FIG. 7 is a similar view to FIG. 2, but particularly shows detailed construction thereof.

Referring to FIG. 7, a main power source E employed in the camera is connected to a delay circuit 17 through a switch $sw$ which cooperatively operates with a release of a shutter button (not shown) and further to a pulse producing circuit 18. Upon turning on of the switch $sw$, the delay circuit 17 supplies an electric power from the main power source E toward the pulse producing circuit 18 after certain period of delay, for generating a predetermined width of a pulse signal P in the pulse producing circuit 18.

The output terminal of the pulse producing circuit 18 is connected to anodes of the light emission diodes LED-1, LED-2 and LED-3 for supplying the pulse $p$ thereto.

The electric power from the main power source E is also applied to a movable contact R$a$ of a potentiometer R1 through the switch $sw$. One end of the potentiometer R1 is connected to the anode O1 of the above mentioned light receiving element 2 and the other end of the potentiometer R1 is also connected to the anode O2 of the other light receiving element 5, while the cathodes of the both light receiving elements 2 and 5 are grounded, whereby forming a bridge circuit 19, together with the potentiometer R1. The adjustment of the movable contact R$a$ in the potentiometer R1 may balance the characteristics of the light receiving elements 2 and 5 in the above described manner.

When these light receiving elements 2 and 5 receive particular lights, their internal resistance will decrease in relation to the intensity of said particular light for example, when the spectrum of the received light exists mainly in the infrared region, the internal resistance of the light receiving element 2 becomes smaller than that of the light receiving element 5, while if the spectrum of the received light exists mainly in the ultraviolet region, the internal resistance of the light receiving element 5 becomes smaller than that of the light receiving element 2, whereby causing a difference in the voltage drop between these two light receiving elements 2 and 5.

Still referring to FIG. 7, the anodes O1 and O2 of the light receiving elements 2 and 5 are applied to the input terminals of a first comparator 20 for comparing the above mentioned voltage drops in the light receiving elements 2 and 5, and the output terminal of the first comparator 20 is connected to the anode of the light emission diode LED-1.

When the voltage drop in the light receiving element 2 is smaller than that of the light receiving element 5, the first comparator 20 generates a low level signal for allowing the pulse signal $p$ from the pulse producing circuit 18 to pass through the light emission diode LED-1, whereby emitting light therefrom to form the mark on the frame of the film and indiacting that the type of the illumination is of tungsten-light type. On the other hand, when the voltage drop in the light receiving element 5 is smaller than that of the light receiving element 2, the first comparator 20 generates a high level signal for forbidding the pulse signal $p$ to pass through the light emission diode LED-1. The anode O2 of the light receiving element 5 is also connected to one of the two input terminals of the second comparator 23 through an amplifier 21 and a rectifier 22.

The other input terminal of the second comparator 23 is connected to a reference voltage producing circuit 27 including a potentiometer R2, wherein a movable contact $Rb$ of the potentiometer R2 is preadjusted in a position to produce a suitable voltage to determine whether the voltage signal from the anode O2 contains an alternating component or not in a manner described hereinbelow.

When the voltage signal obtained from the anode O2 of the light receiving element 5 contains the alternating component, there will be a voltage drop in the peak value across the rectifier 22 due to its rectifying operation, however, if above mentioned voltage signal contains no alternating component, there will be no voltage drop in the peak value across the rectifier 22. Therefore, by fixing the reference voltage in a level somewhere between these two peak values, that is the peak value which had voltage drop and the peak value which did not have voltage drop, it is possible to determine whether the voltage signal from the anode O2 of the light receiving element 5 contained the alternating component or not, in the second comparator 23.

The second comparator 23 produces a low level signal when the peak value of the voltage signal from the rectifier 22 is smaller than the reference voltage, and a high level signal when the peak value of the voltage signal from the rectifier 22 is greater than or equal to the reference voltage.

The output terminal of the second comparator 23 is connected to one of the two input terminals of a NAND gate 24 and also to one of the two input terminals of a NAND gate 25 through an invertor 26. The other input terminals of the both NAND gates 24 and 25 are connected to the output terminal of the first comparator 20. The output terminals of the NAND gates 24 and 25 are connected to the cathodes of the light emission diodes LED-2 and LED-3, respectively, to form a suitable logical operation circuit.

This logical operation circuit operates in different manner with respect to three different cases as described hereinbelow.

Firstly, when the light of the illumination exists mostly in infrared region and contains the flickering noise therein, the first and the second comparators 20 and 23 will both produce the low level signals, causing two NAND gates 24 and 25 to produce the high level signals, thereby allowing only the light emission diode LED-1 to emit light for forming the mark on the frame of the film indicative of tungsten-light type illumination.

Secondly, when the light of the illumination exists mostly in ultraviolet region and contains no flickering noise therein, the first and the second comparators 20 and 23 will both produce high level signals, causing two NAND gates 24 and 25 to produce low level signal and high level signal respectively, thereby allowing only the light emission diode LED-2 to emit light for forming the corresponding mark on the frame of the film indicative of natural daylight type illumination.

Thirdly, when the light of the illumination exists mostly in the ultraviolet region and contains flickering noise therein, the first and the second comparators 20 and 23 will produce high level signal and low level signal, respectively, causing two NAND gates 24 and 25 to produce high level signal and low level signal respectively, thereby allowing only the light emission diode LED-3 to emitt light for forming the mark on the frame of the film indicative of artificial daylight type or fluorescent-light type illumination.

In addition to the light emission diodes LED-1, LED-2 and LED-3 employed in the camera as described above, it is preferable to provide other light emission diodes (not shown) or the like being actuated cooperatively with the previously described light emission diodes LED-1, LED-2 and LED-3, in a suitable position on the camera where it is possible to detect the emitted light therefrom directly by the naked eye at every photograph taking for enabling photographers to be informed of the type of the illumination in such shooting, especially when it is hard to detect the type of illumination only by the naked eye.

It should be noted that the switch sw employed in the above described circuit may be coupled with another switch (not shown) for turning off the circuit, regardless to the operation of the switch sw when electronic flash such as "strobe" is used for taking photographs, in a position such as a base plate of an accessory shoe (not shown) for mounting the flash device, thereby the film may not be formed with any marks thereon.

It should also be noted that the light emission diodes LED-1, LED-2 and LED-3 employed in the camera for indicating three different types of the illuminations as described above may not necessary be three, but two of them may possibly yield exactly the same effect as in the three light emission diodes, by the difference in the combination of on and off state, i.e., luminous and dark state of the two light emission diodes. The combination, for example, may be (on, on), (on, off) and (off, on), each of which can be indicative of natural daylight type illumination, fluorescent-light type illumination and tungsten-light type illumination.

Figure 8:
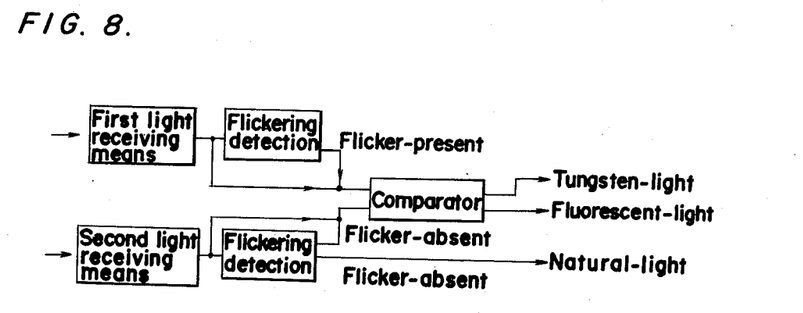
FIG. 8 is a similar view to FIG. 7, but particularly shows a modification thereof.
Figure 9:
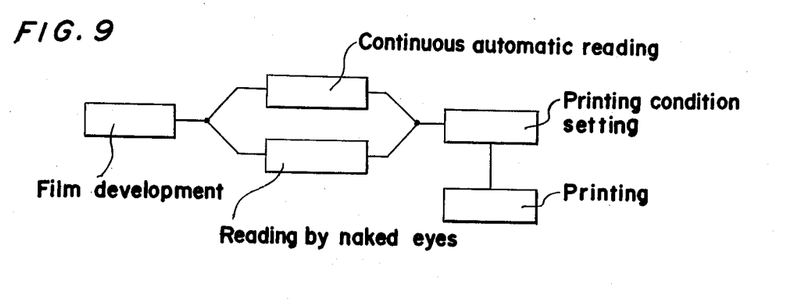
FIG. 9 is a block diagram of a developing and printing system showing various processing steps for the film obtained from the camera incorporating therein the illumination detecting and recording device of the invention.

It should further be noted that the order of the lighting condition detecting process and the flickering detecting process is not of importance, but either order can be employed for the illumination detecting and recording device of the present invention. For example, there is shown, in FIG. 8 a block diagram of an illumination detecting and recording device having lighting condition detecting process and the flickering detecting process in other order than those described in above embodiment, wherein the flickering detecting process is effected before the lighting condition detecting process. In this combination of processes, the natural daylight can be discriminated in the first process, that is, in the flickering detecting process, since only the natural daylight does not contain any flickering noise therein, while all the other types of light do contain such flickering noises more or less. These other types of light, such as fluorescent-light type and tungsten-light type are further fed to the next process, that is, in the lighting condition detecting process for detecting the distributed region of the particular light, whether in the infrared region or in the ultraviolet region, whereby producing a signal indicative of tungsten-light type illumination or fluorescent-light type illumination, in the same manner as described above.

The marks or signs formed on each frame of the film may become visual marks after having developed the film as in the conventional film developing process. When these film are to be printed in a film processing station where a large number of films are to be processed, it is possible to use any known automatic read-out device (not shown) coupled with the conventional automatic printing device (not shown) for quick successive printing of the film in optimum condition by preparing various combination of filters for the films exposed under three different types of illuminations.

On the other hand, when printing these films by hands, each at a time, these marks can be easily read out by naked eyes to prepare suitable printing conditions.

Accordingly, the illumination detecting device of the present invention advantageously helps the photographers to proceed with photographing by recording the type of the illumination on the frame of the film in each photograph taking, and even those photographers who are not skilled in detecting the types of illumination or who have not much experience in this field can use this illumination detecting and recording device without any inconvenience at all.

Furthermore, the optimum condition for printing and development can be achieved by reading out the marks on each frame of the film by the naked eye, or otherwise completely automated film processing system can be constructed by employing the automatic read-out device in the automatic printing and developing device for automatically reading out the marks, and for automatically proceeding the printing and development in the optimum condition.

Furthermore, the illumination detecting and recording device of the present invention can easily be employed in conventional cameras without changing structure thereof, and the known light receiving element incorporated in the camera, for example, so-called "electric eye" can be cooperatively utilized for one of the light receiving element in the illumination detecting and recording device of the present invention. Therefore, this illumination detecting and recording device of the present invention can readily be employed in any type of cameras without giving any difficulties for the photographers to operate the same.

Although the present invention has been fully described by way of example with reference to the attached drawings, it is to be noted that various changes and modifications are apparent to those skilled in the art. Therefore, unless such changes and modifications depart from the scope of the present invention, they should be construed as included therein.

What is claimed is:

1. A method for detecting and recording a type of illumination employed in a camera, which comprises the steps of:
   (a) receiving light from the illumination with at least two light receiving means each of which has a peak value of spectral distribution of energy in a particular wave length of the light and which particular wave lengths are distributed in different ranges from each other;
   (b) comparing the intensities of received light in particular wave lengths between the two light receiving means so as to detect spectral distribution of the light emitted from the illumination;
   (c) detecting a flickering noise existing in the light received by at least one of two light receiving means so as to discriminate natural light having no flickering noise therein from artificial light having flickering noise therein due to alternating voltage of a commercial power supply;
   (d) producing a signal indicative of the type of light from the illumination selectively from the point of the range of the wave length thereof, and also from the point of existence of the flickering noise therein;
   (e) recording a mark on a frame of a film loaded in the camera for recording the type of light from the illumination received through the produced signal.

2. A method for detecting and recording the type of illumination as claimed in claim 2, wherein said particular wave lengths of the two light receiving means exist in infrared region and in ultraviolet region, respectively.

3. A method for detecting and recording the type illumination as claimed in claim 2, wherein said mark formed on the frame of the film is indicative of either one of natural daylight type illumination, fluorescent-light type illumination and tungsten-light type illumination.

4. A method for detecting and recording the type of illumination as claimed in claim 2, wherein said mark recording on the frame of the film is effected by at least two light emission diodes, the combination of energized and deenergized states of the light emission diodes indicating at least three different types of illumination.

5. A device for detecting and recording a type of illumination employed in a camera comprising:
   (a) at least two light receiving means provided on the camera, having their sensitivity in different wave length regions from each other for receiving the light from a subject to be photographed, and for generating a signal from each of light receiving means in relation to the amount of the light received thereon;
   (b) a discriminating means provided in the camera for discriminating the type of illumination among the types of natural daylight type, fluorescent-light type and tungsten-light type, upon receipt of the signal from the light receiving means, and for generating a signal indicative of type of illumination; and
   (c) a recording means for recording a mark indicative of the type of illumination on a film in an exposure station upon receipt of the signal obtained from the discriminating means.

6. A device for detecting and marking a type of illumination as claimed in claim 5, wherein said light receiving means comprises:
   (a) a first light receiving means having its sensitivity in the infrared region and in the visual region near the infrared region for receiving light in said particular regions, and for generating a first signal with its magnitude being in relation to the amount of light received thereon:
   (b) a second light receiving means having its sensitivity in the ultraviolet region and in the visual region near the ultraviolet region for receiving light in said particular regions, and for generating a second signal with its magnitude being in relation to the amount of light received thereon.

7. A device for detecting and recording a type of illumination as claimed in claim 5, wherein said discriminating means comprises:
   (a) a comparing means for comparing the magnitude of the first and second signal obtained from the first and second light receiving means, respectively, and for generating two types of signals, one type of the two types of signals being produced when the magnitude of the second signal is greater than that of the first signal for indicating that the type of illumination is of infrared type, substantially tungsten-light type, and the other type of the two types of signals being produced when the magnitude of the first signal is greater than or equal to that of the second signal for indicating that the type of illumination is of natural and artificial daylight type; and (b) a flickering detecting means for detecting the existence of a flickering noise in the light from the illumination upon receipt of said other type of the two types of signals, and for generating two kinds of signals, one kind of the two kinds of signals being produced when the existence of the flickering noise is detected for indicating that the type of illumination is of artificial daylight type, substantially fluorescent-light type, and the other kind of the two kinds of signals being produced when the existence of the flickering noise is not detected for indicating that the type of illumination is of natural daylight type, substantially sun-light type.

8. A device for detecting and recording a type of illumination as claimed in claim 5, wherein said recording means essentially consists of at least two luminescent means for emitting light therefrom toward a frame of the film loaded in the camera and located in the exposure station of the same camera and for forming a mark indicative of the type of illumination on said frame of the film.

9. An automatic film processing system for automatically effecting development of an exposed film having marks on a non-image-receiving portion of each frame thereof, said marks being indicative of the type of illumination for each photograph taken, and for printing developed images on the exposed film onto a photosensitive paper, which comprises the combination of:

(a) means for automatically developing the film;

(b) means for reading out the marks on the non-image-receiving portion of each frame of the film to produce a read-out signal indicative of the marks on each frame; and (c) means for effecting the printing according to the read-out signal indicative of the type of the illumination.

10. A device for detecting and recording a type of illumination as claimed in claim 5, herein said discriminating means comprises:

(a) a flickering detecting means for detecting the existence of a flickering noise in the light from the illuminaion upon receipt of the first and second signals, and for generating two types of signals, one type of the two types of signals being produced when the existence of the flickering noise is detected for indicating that the type of illumination is of artificial illumination, and the other type of the two types of signals being produced when the existence of the flickering noise is not detected for indicating that the type of illumination is of natural daylight type, substantially sun-light type; and (b) a comparing means for comparing the magnitude of the first and second signals obtained from the first and second light receiving means, respectively, and for generating two kinds of signals, one kind of the two kinds of signals being produced when the magnitude of the second signal is greater than that of the first signal, for indicating that the type of illumination is of artificial infrared type, substantially tungsten-light type, and the other kind of the magnitude of the first signal being greater than or equal to that of the second signal for indicating that the type of illumination is of artificial daylight type, substantially fluorescent-light type.

* * * * *